United States Patent
Reimann et al.

(10) Patent No.: US 10,780,758 B2
(45) Date of Patent: Sep. 22, 2020

(54) SHOCK-ABSORBING DAMPER WITH A SPRING PLATE FASTENED THERETO, AND METHOD FOR THE FASTENING OF A SPRING PLATE TO A SHOCK-ABSORBING DAMPER

(71) Applicants: ThyssenKrupp Bilstein GmbH, Ennepetal (DE); ThyssenKrupp AG, Essen (DE)

(72) Inventors: Thilo Reimann, Ennepetal (DE); Michael Hönig, Ennepetal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/522,205

(22) PCT Filed: Oct. 12, 2015

(86) PCT No.: PCT/EP2015/073589
§ 371 (c)(1),
(2) Date: Apr. 26, 2017

(87) PCT Pub. No.: WO2016/071081
PCT Pub. Date: May 12, 2016

(65) Prior Publication Data
US 2017/0313151 A1    Nov. 2, 2017

(30) Foreign Application Priority Data
Nov. 5, 2014   (DE) .................. 10 2014 116 109

(51) Int. Cl.
*B60G 15/06*   (2006.01)
*F16F 1/12*    (2006.01)
(Continued)

(52) U.S. Cl.
CPC .............. *B60G 15/063* (2013.01); *F16F 1/12* (2013.01); *F16F 9/3235* (2013.01);
(Continued)

(58) Field of Classification Search
CPC .......... B60G 15/063; B60G 2204/1242; B60G 2204/12422; F16F 1/12; F16F 13/007; F16F 9/3235
See application file for complete search history.

(56) References Cited

U.S. PATENT DOCUMENTS

| 2,660,449 A | 11/1953 | MacPherson |
| 3,263,983 A * | 8/1966 | Bliven ............... B60G 13/003 267/120 |

(Continued)

FOREIGN PATENT DOCUMENTS

| CN | 1572548 A | 2/2005 |
| CN | 200971945 Y | 11/2007 |

(Continued)

OTHER PUBLICATIONS

English Translation of International Search Report issued in PCT/EP2015/073589, dated Jan. 14, 2016 (dated Jan. 22, 2016).
(Continued)

*Primary Examiner* — Laura Freedman
(74) *Attorney, Agent, or Firm* — thyssenkrupp North America, LLC

(57) ABSTRACT

A device for damping vibrations may comprise a hollow damper tube, a piston rod with a piston fastened thereto, at least one spring plate, and at least one securing element. The piston may be disposed within the damper tube, and the spring plate may be disposed outside the damper tube. To achieve a reliable connection between the spring plate and the damper tube in a cost-effective manner, the spring plate may be connected to the damper tube in both a force-fitting (Continued)

manner and a form-fitting manner. The present disclosure further concerns motor vehicles that employ such devices, as well as methods for fastening spring plates to damper tubes.

10 Claims, 4 Drawing Sheets

(51) Int. Cl.
    *F16F 9/32*     (2006.01)
    *F16F 13/00*     (2006.01)

(52) U.S. Cl.
    CPC .... *F16F 13/007* (2013.01); *B60G 2204/1242* (2013.01); *B60G 2204/12422* (2013.01)

(56) References Cited

U.S. PATENT DOCUMENTS

| | | | | |
|---|---|---|---|---|
| 3,275,312 A * | 9/1966 | Monnin | ............... | B60G 13/003 |
| | | | | 267/220 |
| 3,951,391 A * | 4/1976 | Papousek | ............ | B60G 13/001 |
| | | | | 267/218 |
| 5,129,137 A | 7/1992 | Orihara | | |
| 5,553,713 A * | 9/1996 | Sydekum | ............ | B60G 15/063 |
| | | | | 267/175 |
| 5,848,676 A * | 12/1998 | Deigner | ............... | B60G 15/063 |
| | | | | 188/321.11 |
| 5,966,813 A | 10/1999 | Durand | | |
| 6,341,678 B1 | 1/2002 | Hoyte | | |
| 6,692,012 B2 * | 2/2004 | Fullenkamp | ......... | B60G 15/063 |
| | | | | 267/179 |
| 8,196,942 B2 * | 6/2012 | Heeren | ............... | B60G 13/006 |
| | | | | 280/124.1 |
| 10,086,869 B2 * | 10/2018 | Urbanski | ................. | B62D 7/22 |
| 2002/0011697 A1 * | 1/2002 | Pesch | .................... | B60G 15/063 |
| | | | | 267/64.23 |
| 2002/0158393 A1 * | 10/2002 | Handke | ................ | B60G 13/003 |
| | | | | 267/221 |
| 2003/0132072 A1 * | 7/2003 | Sawai | .................. | B60G 15/063 |
| | | | | 188/281 |
| 2005/0218574 A1 | 10/2005 | Nishimura | | |

FOREIGN PATENT DOCUMENTS

| | | |
|---|---|---|
| CN | 102562913 A | 7/2012 |
| DE | 4011423 A | 10/1990 |
| DE | 19515643 C | 11/1996 |
| DE | 19649551 A | 10/1997 |
| DE | 19851019 C | 6/2000 |
| DE | 10120415 C | 10/2002 |
| DE | 10144242 A | 3/2003 |
| DE | 10 2006 016 470 A | 10/2007 |
| DE | 102007030549 A | 1/2009 |
| EP | 2009322 A | 12/2008 |
| JP | 2004003558 A | 1/2004 |
| JP | 2004353699 A | 12/2004 |
| KR | 20090110582 A | 10/2009 |

OTHER PUBLICATIONS

English abstract of DE19515643.
English abstract of DE1014424.
English abstract of DE19649551.
English abstract of DE102007030549.
English abstract of JP2004003558.
English abstract of JP2004353699.

* cited by examiner

SHOCK-ABSORBING DAMPER WITH A SPRING PLATE FASTENED THERETO, AND METHOD FOR THE FASTENING OF A SPRING PLATE TO A SHOCK-ABSORBING DAMPER

CROSS REFERENCE TO RELATED APPLICATIONS

This application is a U.S. National Stage Entry of International Patent Application Serial Number PCT/EP2015/073589, filed Oct. 12, 2015, which claims priority to German Patent Application No. DE 10 2014 116 109.2 filed Nov. 5, 2014, the entire contents of both of which are incorporated herein by reference.

FIELD

The present disclosure generally relates to devices for damping vibrations, including such devices for use in motor vehicles, as well as methods for fastening spring plates to damper tubes.

BACKGROUND

Numerous shock absorbers and methods for the production thereof are known in the field of vehicle engineering, in particular chassis engineering. Shock absorbers are part of the chassis of motor vehicles and generally interact there with springs: while the springs ensure that the wheels after a deflection are always returned again into their starting position, the shock absorbers ensure that the wheel vibrations which inevitably arise because of the sprung mounting subside as rapidly as possible. "Shock absorbers" are therefore actually not intended to damp any shocks, but rather vibrations. Accordingly, shock absorbers are vibration dampers. An effective vibration damping is sought not only for comfort reasons; it also serves for the purpose of reducing wheel load fluctuations and therefore of ensuring good ground adhesion of the wheels.

In practice, use is made particularly predominantly of hydraulic shock absorbers which have a cylindrical oil-filled housing in which a likewise cylindrical piston can be moved to and fro in the axial direction via a piston rod led out of the housing. The piston has small openings through which oil can flow during a movement of the piston. This gives rise to a flow resistance by means of which the vibration energy is converted into heat and is therefore absorbed.

On account of the cylindrical shape of shock absorbers, a construction has already been implemented at an early point, in which the spring used is a spirally wound helical spring which is arranged in such a manner that the coils of the helical spring run around the shock absorber on the outside. The shock absorber is therefore arranged "in" the helical spring. Such combinations of shock absorber and spring are also referred to as a "strut unit" or "strut support" and are frequently used, for example, in the widespread "MacPherson" strut units (U.S. Pat. No. 2,660,449). A particular challenge in the case of strut units of this type consists in fastening the spring to the shock absorber in a reliable manner. For this purpose, contact surfaces for the spring are regularly provided on the shock absorber, said contact surfaces encircling the shock absorber annularly ("spring plate"). Since high loads are introduced into the shock absorber via the spring plates, the fastening of the spring plates to the—often thin-walled—damper tube of the shock absorber has to take place by means of a particularly reliable connection.

In solutions known from the prior art, the spring plate is often fastened to the damper tube of the shock absorber by welded joints. Welded joints are used, for example, because of their great reliability. However, because of the thin-walled design of the damper tubes and the associated risk of thermally induced distortion, only certain welding methods can be used for this purpose, for example laser welding. Such welded joints are, however, relatively complicated to produce since, for this purpose, special welding units are required, the provision of which requires a high capital outlay. A further inherent disadvantage of welded joints consists in that not all material pairings can be welded to one another. This may have the result that the materials cannot be selected solely in respect of mechanical properties and costs, but also have to be selected in respect of their welding properties.

DETAILED DESCRIPTION

Figure 1:
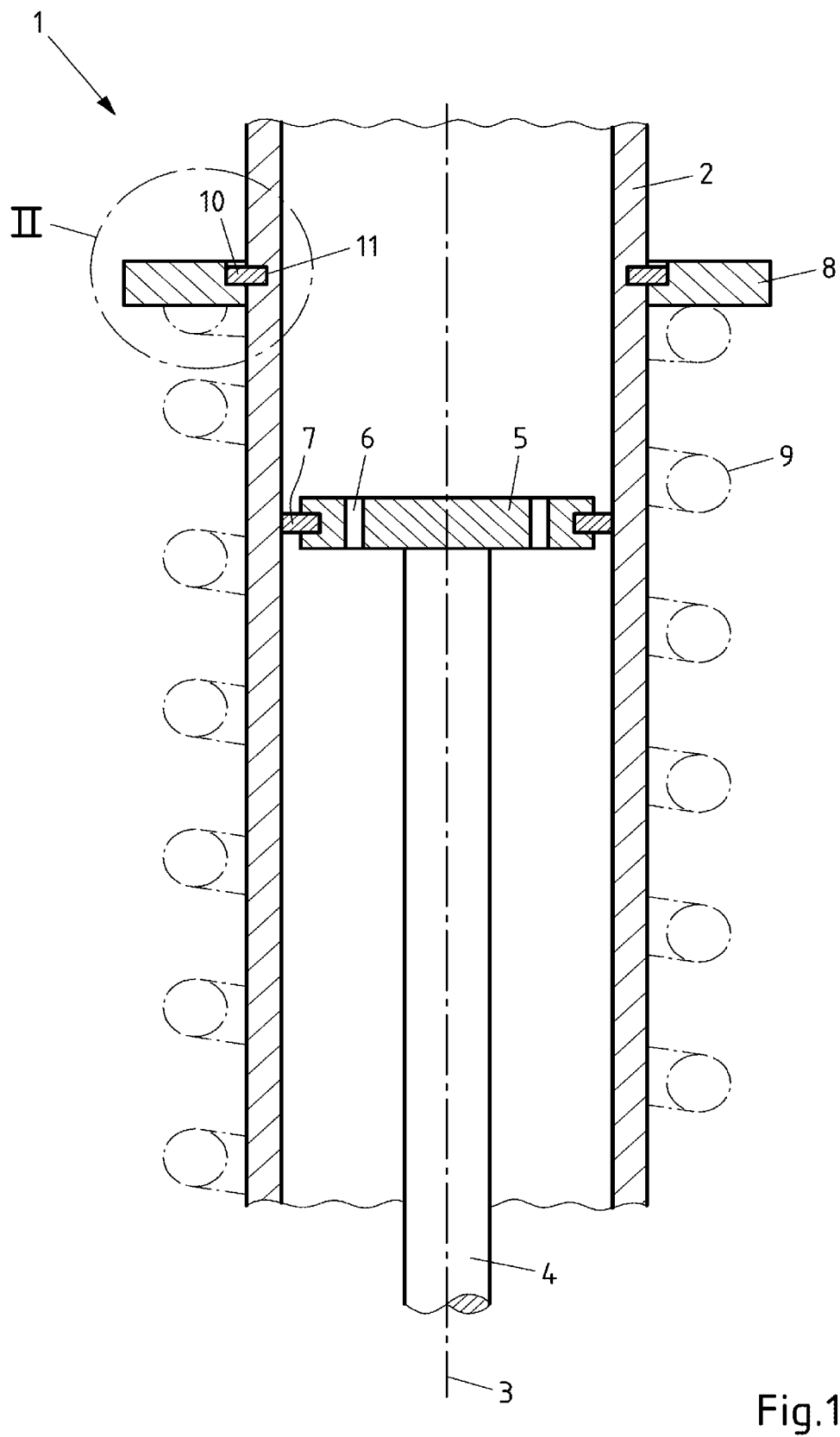
FIG. 1 is a sectional view of an example device according to the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns devices for damping vibrations. In one example, such a device may comprise a hollow damper tube, a piston rod with a piston fastened thereto, at least one spring plate, and at least one securing element. The piston may be arranged within the damper tube, and the spring plate may be disposed outside the damper tube. Further, the present disclosure also relates to the use of such devices in motor vehicles. Further yet, the present disclosure concerns methods for fastening spring plates to damper tubes.

Against the background set forth above, the present disclosure is based at least in part on the object of refining and developing a device for damping vibrations in such a manner that a reliable connection between a spring plate and a damper tube is achieved in a cost-effective manner.

One example way to achieve this object is by connecting a spring plate to a damper tube in both a force-fitting and a form-fitting manner.

The device is first of all distinguished by a hollow damper tube. The damper tube serves for receiving liquids which are intended to be used for the vibration damping—for example oil. The damper tube is preferably shaped cylindrically at least in sections or else completely and has a longitudinal axis in the longitudinal direction—i.e. in the axial direction. The wall thickness of the damper tube can be within the range of between 1 mm and 5 mm. The damper tube is preferably produced from metal, in particular steel or aluminum. The damper tube is preferably of two-part design, wherein the two parts can be pushed telescopically one inside the other. Two separate damper tubes can also be present, wherein the second damper tube is preferably arranged in the first damper tube ("two-tube damper"). The device also comprises a piston rod with a piston fastened thereto. Tensile or compressive forces which have been introduced into the device are transmitted to the piston via the piston rod. The piston is arranged within the damper tube in such a manner that said piston can be displaced in the axial direction. Furthermore, the device comprises at least one spring plate. The spring plate can serve as an abutment or stop of a supporting spring. The spring plate—like a supporting spring—is therefore preferably arranged outside the damper tube. The supporting spring can be a helical spring or a pneumatic spring, for example a bellows spring. The device also has a securing element which can serve, for example, to connect the spring plate to the damper tube in a form-fitting manner.

According to the invention, it is provided that the spring plate is connected to the damper tube both force-fitting and in a form-fitting manner. A frictional connection is understood as meaning a connection which is substantially based on the friction between the connected components (for example press-fit connection). By contrast, a form-fitting connection is understood as meaning a connection which is substantially based on the intermeshing or the abutment between the connected components. By means of a combination of frictional and form-fitting connections, a particularly reliable connection of the spring plate to the damper tube can be achieved. In addition, facilitated production can be achieved since the form-fitting connection can be used, for example, to position and to fix the spring plate during the production of the frictional connection. The form-fitting connection can therefore also take on the function of an "installation aid". The spring plate is preferably connected to the damper tube exclusively force-fitting and in a form-fitting manner. This has the advantage that further connections, for example integrally-bonded welded joints or adhesive connections, can be dispensed with. It can be provided that the frictional connection and the form-fitting connection act in different directions. For example, the form-fitting connection can fix the spring plate (exclusively) in the axial direction while the frictional connection (also) fixes the spring plate in the radial direction.

According to a refinement of the device, it is provided that the spring plate is connected to the damper tube in a form-fitting manner by the securing element. This can be achieved, for example, by a securing ring, in particular a snap ring, which is fixed to the damper tube. In this manner, the securing ring constitutes a form-fitting stop for the spring plate. The spring plate can be fixed on one side or on both sides with a securing ring. Accordingly, in particular a form-fitting securing or fixing of the spring plate in the axial direction can be achieved by the securing element.

A further development of the device provides that the spring plate is connected to the securing element and/or to the damper tube force-fitting by a press-fit connection. The press-fit connection can be achieved, for example, by installation with temperature differences or by plastic deformation of the spring plate. By means of the press-fit connection, securing or fixing of the spring plate can be achieved both in the axial direction and in the radial direction.

In a further refinement of the device, it is provided that the securing element is a securing ring, in particular a snap ring. Securing rings are typically not configured to be completely encircling; instead, they have an interruption or opening which facilitates the installation on a shaft or in a bore. Securing rings are reasonably priced and easily installable and can serve to form an axially loadable shoulder for fixing the spring plate.

In order to facilitate the fixing of the securing element, it can be provided, according to a development of the device, that the damper tube comprises a groove for receiving the securing element. Grooves can easily be produced (for example by turning), in particular in the case of rotationally symmetrical components, and provide precise positioning and secure fixing of the securing element in the axial direction.

With regard to this development, it is furthermore proposed that the groove is molded into the outer surface of the damper tube and is annularly encircling. Direct molding of the groove into the outer surface of the damper tube permits positioning of the groove at any desired point of the damper tube. A completely encircling groove can be produced more simply than an only partially encircling groove and also permits installation of securing elements in any desired rotational position of the damper tube.

According to a further refinement of the device, it is provided that the spring plate is of annular design and runs around the damper tube. By means of an annular, i.e. completely encircling design of the spring plate, the spring plate can support a supporting spring, for example a helical spring, in any rotational position. In addition, annular components can be configured to be rotationally symmetrical and can therefore be produced and machined in a particularly simple manner (for example by turning). Furthermore, the annular configuration permits simple installation since the spring plate can be simply pushed onto the damper tube before further production steps take place if necessary.

A further development of the device provides that the spring plate comprises a step. With regard to this development, it is furthermore proposed that the step is arranged on the inner side of the spring plate and is annularly encircling. The shape and size of the step can be coordinated, for example, with the securing element, and therefore the step can serve as a abutment or support for the securing element. Centering of the spring plate can thereby also be achieved. A further function of the step can consist in that an unintentional release and dropping out of the securing ring from the groove—for example as a consequence of heavy vibrations—is prevented. By means of the annularly encircling configuration of the step, the spring plate can be placed onto the securing element in any rotational position.

According to a further refinement of the device, it is provided that the spring plate is produced from metal, in particular from steel or aluminum. Metals are distinguished by great rigidity and high strength, and therefore the spring plate reliably withstands even dynamic loads. In addition, metals have the advantage that they have a high degree of toughness and therefore, for example, can be readily plastically deformed.

The previously described device for damping vibrations is suitable in a particular manner in all of the refinements illustrated for use in a motor vehicle. This is so in particular because the device can be produced rapidly and cost-effectively, which is essential with the piece numbers customary in the automobile industry. In addition, shock absorbers or vibration dampers in motor vehicles are exposed to particular loads since the shock absorbers are not only loaded there by the vibration to be damped, but are regularly also exposed to further influences (for example vibrations, temperature fluctuations). The device described takes these requirements into account, for example by means of the particularly reliable combination of frictional and form-fitting fastening of the spring plate to the damper tube.

The object described at the beginning is also achieved by a method for fastening a spring plate to a damper tube, comprising the following steps: a) providing a damper tube, a securing element and a spring plate, b) molding a groove into the damper tube, c) inserting the securing element into the groove, d) pushing the spring plate onto the damper tube, and e) producing a press-fit connection between the spring plate and the damper tube by plastic deformation of the spring plate.

The method is distinguished by the fact that first of all a damper tube, a securing element and a spring plate are provided. A groove is subsequently molded into the damper tube and the securing element is inserted into the groove. The groove can be molded in, for example, by means of turning. The spring plate is then pushed onto the damper tube. The spring plate is preferably pushed onto the damper tube to an extent until it butts against the securing element. The securing element can therefore serve as an axial stop for the spring plate. Finally, a press-fit connection is produced between the spring plate and the damper tube by the spring plate being plastically deformed. It can be provided that only the spring plate is deformed.

Alternatively, it can be provided that, in addition to the spring plate, other components, in particular the securing element and/or the damper tube, are also plastically deformed.

According to a refinement of the method, it is provided that in step e), at least two tools are moved in the axial direction and act here on both sides of the spring plate. The effect which can be achieved by the use of two tools acting counter to each other or with each other is that the forces introduced into the spring plate during the deformation do not have to be supported by the securing element or the damper tube, but rather are substantially absorbed by the two tools. In addition, the use of a plurality of tools permits a particularly flexible deformation of the spring plate. For example, the spring plate can be deformed on its upper side in a different manner than on its lower side.

With regard to this refinement, it is furthermore proposed that the tools are annularly encircling and are pushed onto the damper tube. Since the tools are configured annularly, the tools can be guided and centered by the damper tube. A further advantage of this configuration of the tools resides in the fact that the spring plates can be deformed simultaneously along their entire circumference, which accelerates the production.

In respect of the configuration of the tools, it is finally furthermore proposed that the tools have projections with which said tools act on the spring plate. A particularly high concentration of pressure and therefore a particularly effective deformation can be achieved by means of the projections. In addition, the projections can be arranged and shaped to meet requirements. For example, the projections can have interruptions even in the case of an annular configuration of the tools and can therefore be configured in a non-annular or encircling manner. This permits a deformation of the spring plate only in certain regions or segments.

FIG. 1 illustrates a device 1 according to the invention for damping vibrations. The device 1 comprises a damper tube 2 which is shaped cylindrically and has a longitudinal axis 3 running in the axial direction. The damper tube 2 is of hollow design and in its interior can receive a liquid (not illustrated in FIG. 1), for example oil. The device 1 also comprises a piston rod 4, to the lower end of which a piston 5 is fastened. The piston rod 4 is arranged centrally in the damper tube 2 and therefore runs along the longitudinal axis 3. The piston 5 has at least one piston valve 6 and an encircling seal 7. The seal 7 prevents the liquid present in the damper tube 2 from flowing past the piston 5 during a movement of the piston 5. The liquid can therefore flow only through the piston valves 6, with flow energy being converted into heat.

The device 1 illustrated in FIG. 1 also comprises a spring plate 8 which is of annular or disk-shaped design and runs around the damper tube 2. The spring plate 8 serves as a stop of a helical spring 9, the coils of which run around the damper tube 2. As an alternative thereto, the spring plate 8 can serve as a stop of a pneumatic spring (not illustrated in FIG. 1). The spring plate 8 is fastened via a securing element 10 which connects the spring plate 8 to the damper tube 2 in a form-fitting manner in the direction of the longitudinal axis 3 and also via a frictional press-fit connection. The securing element 10 can be, for example, a securing ring or a snap ring. The securing element 10 is arranged in a groove 11 which is molded into the outer surface of the damper tube 2 and encircles the damper tube 2 annularly.

Figure 2A:
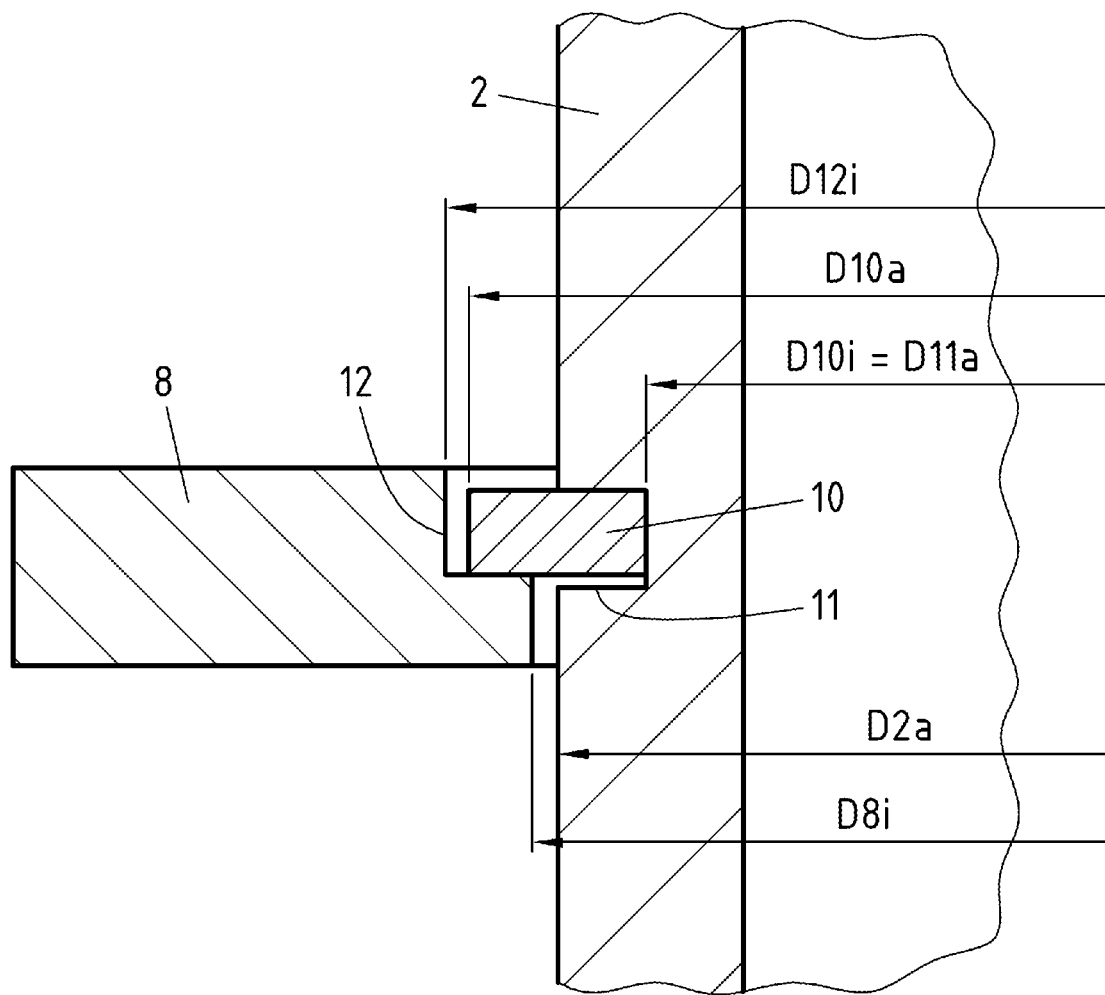
FIG. 2A is an enlarged detail view of a region of the device denoted by II in FIG. 1, with respect to a first production step.

FIG. 2A shows an enlarged detailed view of that region of the device which is denoted by II in FIG. 1, during a first production step. In particular, the connecting region between the damper tube 2 and the spring plate 8 is illustrated in the enlarged view. Those regions of the device which have already been described in conjunction with FIG. 1 are provided with corresponding reference signs in FIG. 2A. It can be seen in FIG. 2A that the damper tube 2 has a cylindrical outer surface with an outside diameter $D2a$ and that the spring plate 8 has a cylindrical inner surface with an inside diameter $D8i$, wherein, in the production step shown in FIG. 2A, the outside diameter $D2a$ of the damper tube 2 is smaller than the inside diameter $D8i$ of the spring plate 8.

This has the consequence that the spring plate 8 can be pushed loosely onto the damper tube 2. The encircling groove 11 is molded into the damper tube 2 from the outside and serves as a seat for the securing element 10. In order to form a form-fitting connection, the securing element 10 has an inside diameter $D10i$ and an outside diameter $D10a$, wherein the inside diameter $D10i$ of the securing element 10 is smaller than the outside diameter $D2a$ of the damper tube 2, and wherein the outside diameter $D10a$ of the securing element 10 is greater than the outside diameter $D2a$ of the damper tube 2. In the case of the production step shown in FIG. 2A, the inside diameter $D10a$ of the securing element 10 corresponds to the outside diameter $D11a$ of the groove 11. The spring plate has an encircling step 12 on its inner side. The step 12 has an inside diameter $D12i$ which, in the production step shown in FIG. 2A, is greater than the outside diameter D10a of the securing element 10. The spring plate 8 can thereby be pushed loosely onto the securing element 10.

Figure 2B:
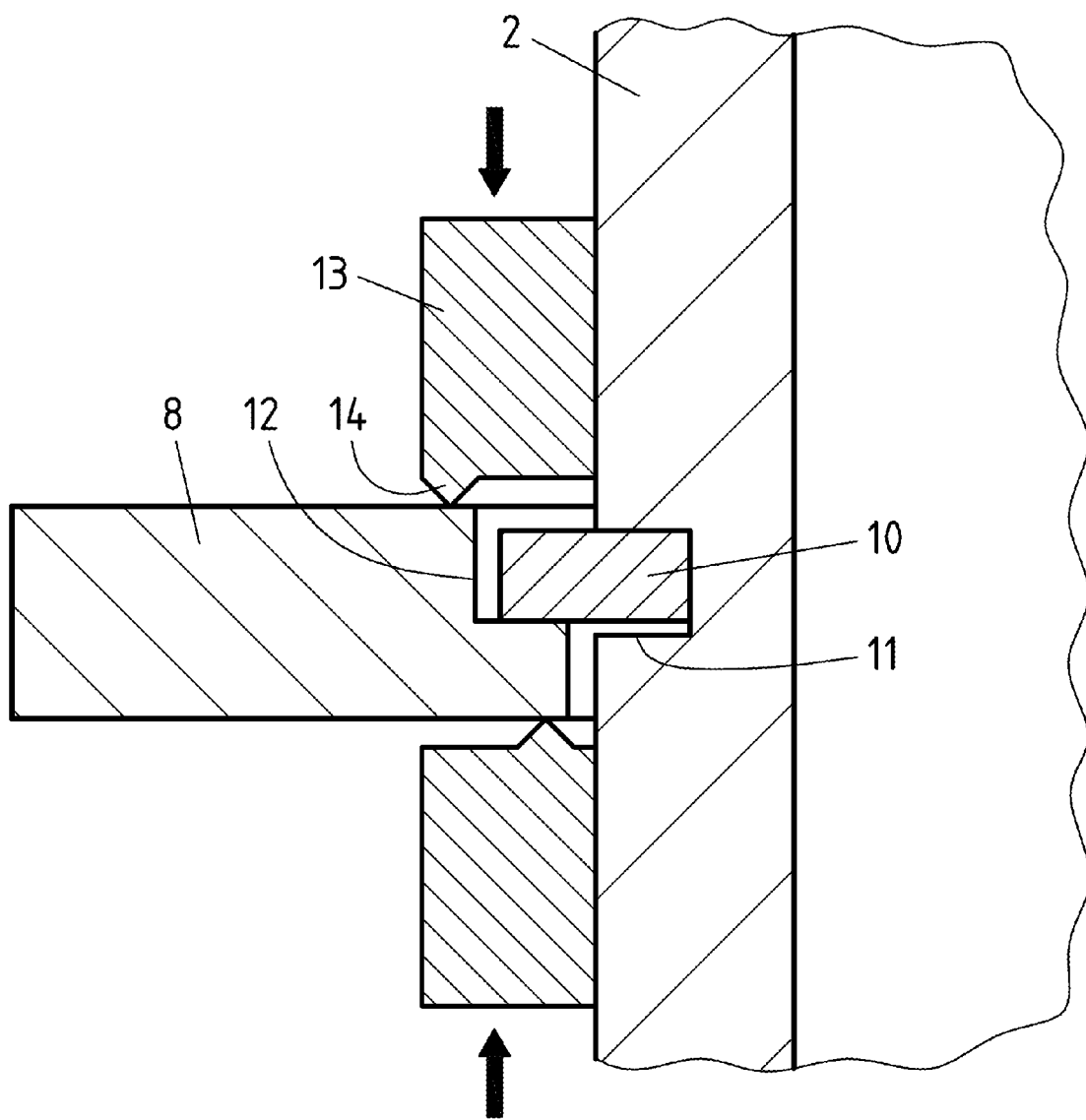
FIG. 2B is an enlarged detail view of the region of the device denoted by II in FIG. 1, with respect to a second production step.

FIG. 2B illustrates an enlarged detailed view of that region of the device 1 which is denoted by II in FIG. 1, during a second production step. Those regions of the device 1 which have already been described in conjunction with FIG. 1 or FIG. 2A are also provided with corresponding reference signs in FIG. 2B. In contrast to the first production step (FIG. 2A), in the second production step (FIG. 2B), two annular tools 13 are pushed onto the damper tube 2 on both sides of the spring plate 8. The tools 13 have projections 14 which are arranged on that side of the respective tool 13 which is assigned to the spring plate 8. The two tools 13 are moved toward each other in the axial direction—i.e. along the longitudinal axis 3—and in this case plastically deform certain regions of the spring plate 8. The direction of movement of the tools 13 is illustrated schematically in FIG. 2B by means of arrows.

Figure 2C:
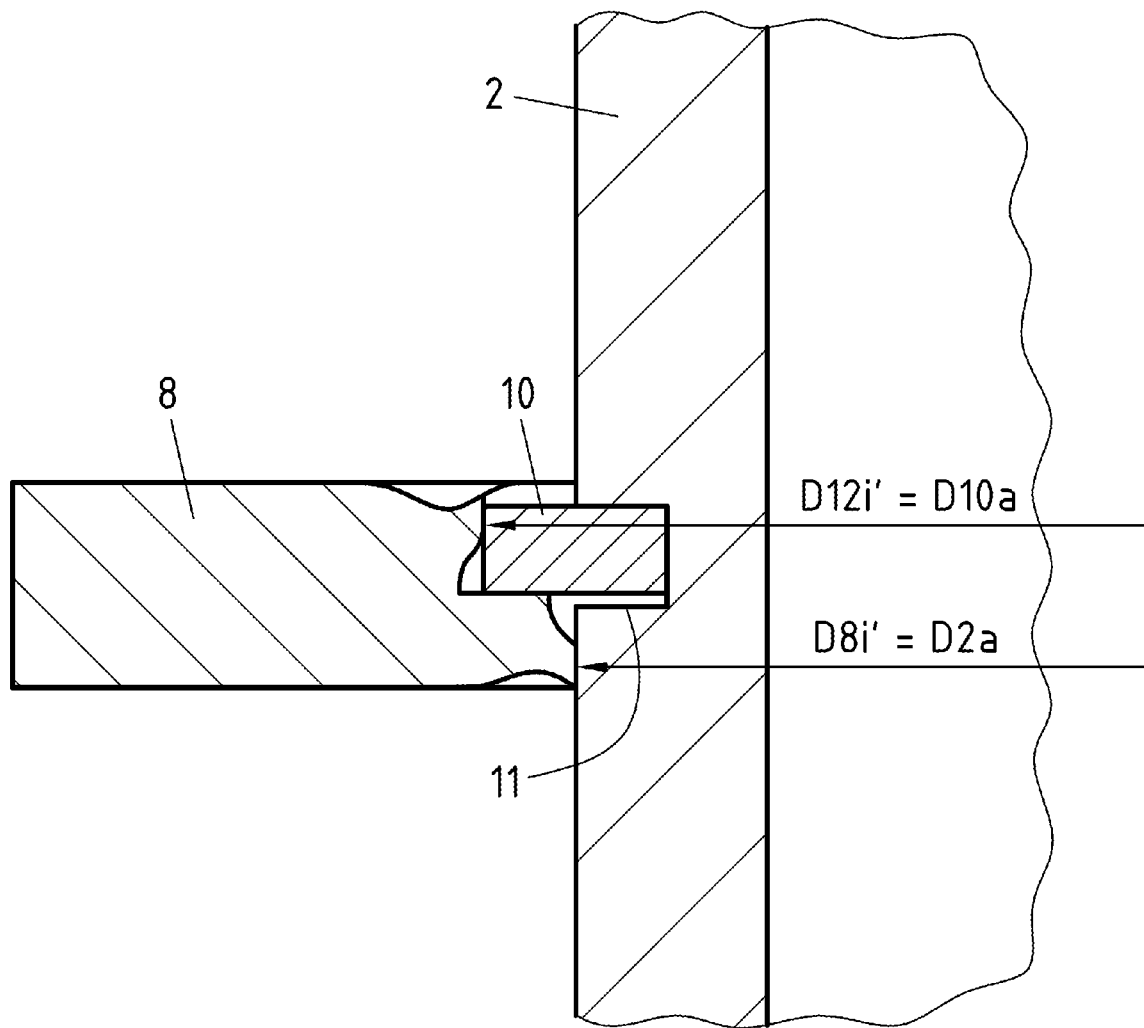
FIG. 2C is an enlarged detail view of the region of the device denoted by II in FIG. 1, with respect to a point after production is completed.

FIG. 2C finally shows an enlarged detailed view of that region of the device 1 which is denoted by II in FIG. 1, after production has finished. Also in FIG. 2C, those regions of the device 1 which have already been described in conjunction with FIG. 1 to FIG. 2B are provided with corresponding reference signs. FIG. 2C shows a state in which the spring plate 8 has been plastically deformed by the tools 13, and the tools 13 have already been pulled off again from the damper tube 2. Clearly visible is a plastic deformation of the spring plate 8, which results in the inside diameter D8i' of the spring plate 8 having been reduced in size and now corresponding to the outside diameter D2a of the damper tube 2. A radial relative movement between the spring plate 8 and the damper tube 2 is therefore no longer possible. The plastic deformation of the spring plate 8 also results in the inside diameter D12i' of the step 12 having been reduced in size and now corresponding to the outside diameter D10a of the securing element 10. Also, a radial relative movement between the spring plate 8 and the securing element 10 is therefore no longer possible. Frictional connections arise at the contact surface between the spring plate 8—in particular its step 12—and the securing element 10, and also at the contact surface between the spring plate 8 and the damper tube 2, because of the friction.

The variant of the device 1 described in FIG. 1 to FIG. 2C is a single-tube damper. However, the described features, in particular the connection between the spring plate 8 and the damper tube 2, can also be transferred to other designs of shock absorbers, in particular to two-tube dampers.

LIST OF REFERENCE SIGNS

1: Device for damping vibrations
2: Damper tube
3: Longitudinal axis (of the damper tube 2)
4: Piston rod
5: Piston
6: Piston valve
7: Seal
8: Spring plate
9: Helical spring
10: Securing element
11: Groove
12: Step
13: Tool
14: Projection
D2a: Outside diameter (of the damper tube 2)
D8i, D8i': Inside diameter (of the spring plate 8)
D10a: Outside diameter (of the securing element 10)
D10i: Inside diameter (of the securing element 10)
D11a: Outside diameter (of the groove 11)
D12i, D12i': Inside diameter (of the step 12)

What is claimed is:

1. A device for damping vibrations, the device comprising:
    a hollow damper tube including a groove;
    a piston rod to which a piston is fastened, wherein the piston is disposed within the hollow damper tube;
    a securing element disposed in the groove; and
    a spring plate disposed outside the hollow damper tube, wherein the spring plate comprises an upper side and a lower side and is axially and rotationally fixedly connected to the hollow damper tube frictionally by way of a press-fit connection in both a force-fitting manner and a form-fitting manner;
    wherein the spring plate is axially and rotationally fixedly connected to the securing element;
    wherein the press-fit connection comprises plastic deformation of the upper side and lower side of the spring plate so as to fixedly connect the spring plate to both the outside of the damper tube and the securing element.

2. The device of claim 1 wherein the securing element connects the spring plate to the hollow damper tube in a form-fitting manner.

3. The device of claim 1 wherein the securing element comprises a securing ring.

4. The device of claim 1 wherein the securing element comprises a snap ring.

5. The device of claim 1 wherein the groove is molded into an outer surface of the hollow damper tube and is annularly encircling.

6. The device of claim 1 wherein the spring plate is configured in an annular design and is disposed around the hollow damper tube.

7. The device of claim 1 wherein the spring plate comprises a step.

8. The device of claim 7 wherein the step is disposed on an inner side of the spring plate and is annularly encircling.

9. The device of claim 1 wherein the spring plate comprises metal.

10. The device of claim 1 wherein the spring plate comprises aluminum.

* * * * *